Jan. 9, 1968  R. BOUGUET  3,363,073
FLUID DETECTION APPARATUS HAVING MAGNETIC ACTUATING MEANS
Filed March 17, 1966  5 Sheets-Sheet 1
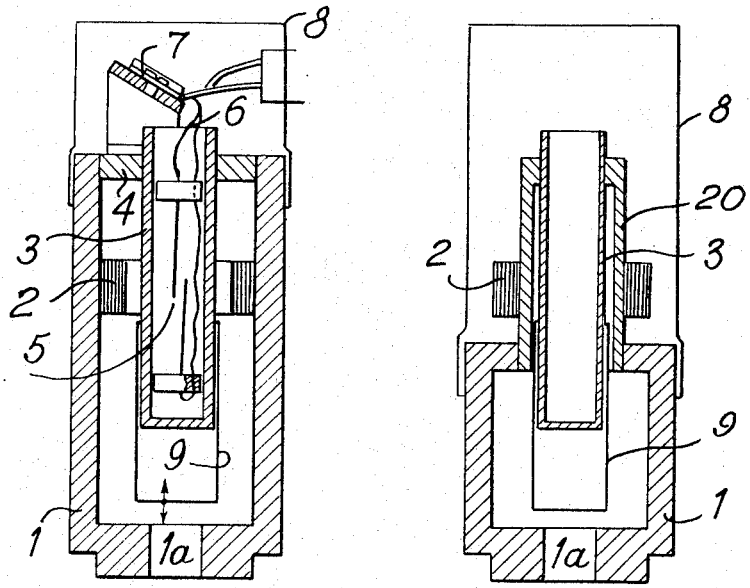
Fig.1. Fig.2
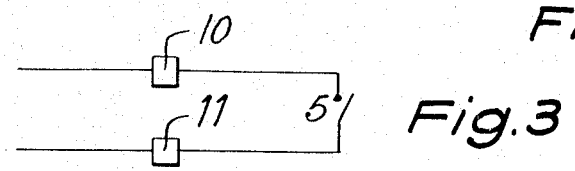
Fig.3
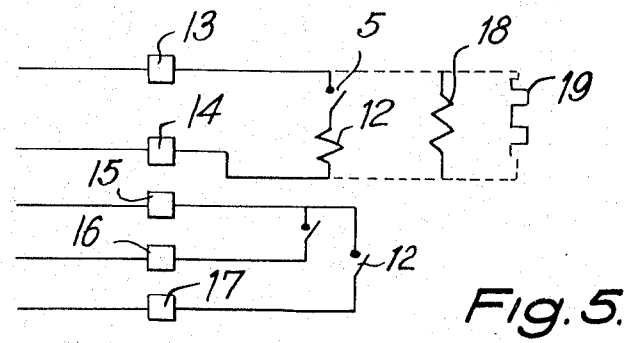
Fig.4
Fig.5.
Fig.6.
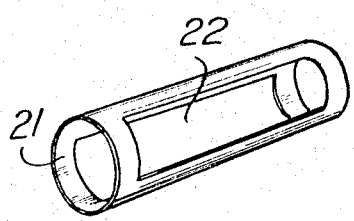

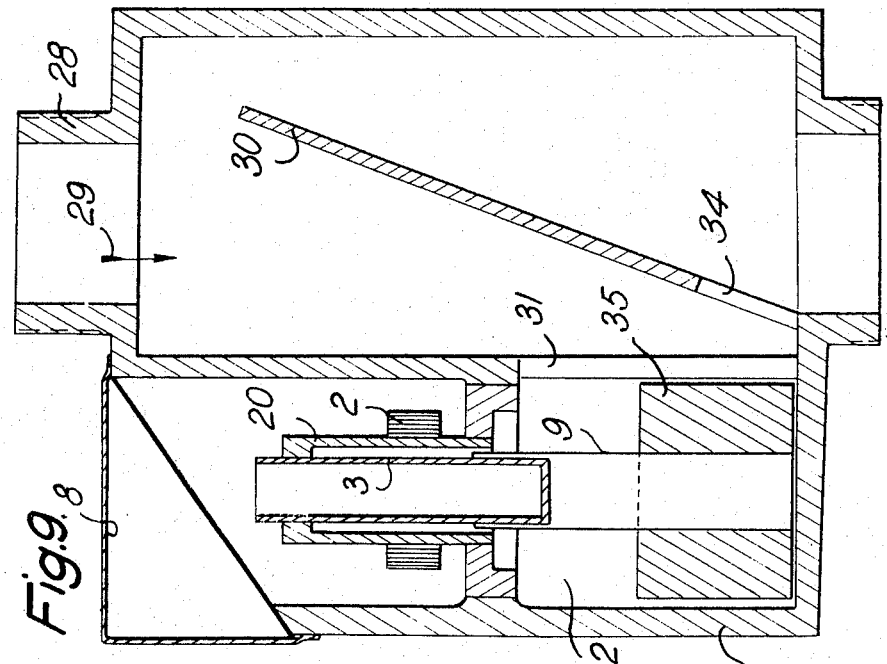
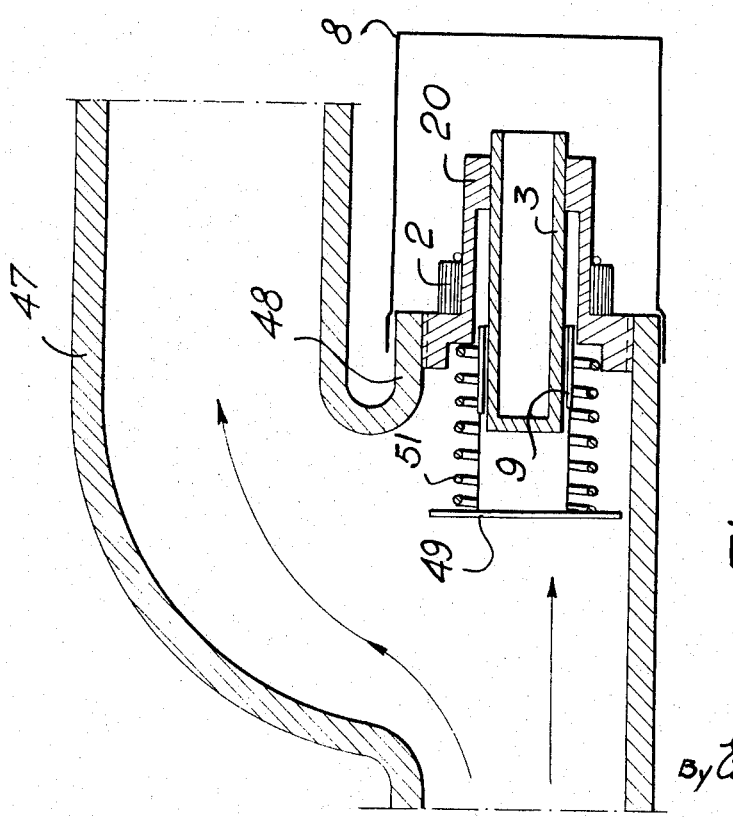

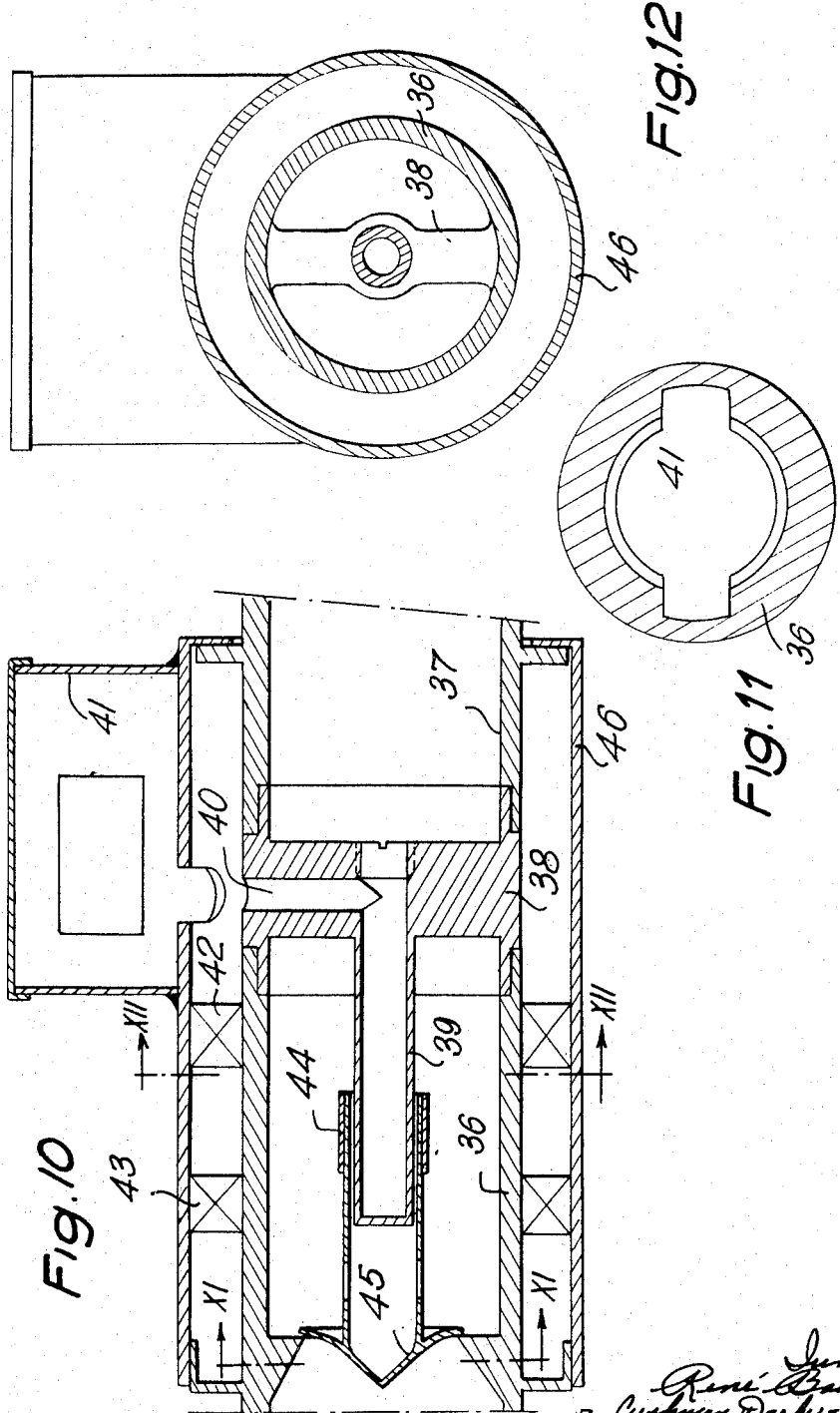

United States Patent Office 3,363,073
Patented Jan. 9, 1968

3,363,073
FLUID DETECTION APPARATUS HAVING
MAGNETIC ACTUATING MEANS
René Bouguet, Residence d'Aygu, Montelimar,
Drome, France
Filed Mar. 17, 1966, Ser. No. 535,138
Claims priority, application France, May 20, 1965,
17,768, Patent 1,444,204
15 Claims. (Cl. 200—81.9)

ABSTRACT OF THE DISCLOSURE

A switch assembly is disclosed with a magnetic metal casing acting as protection against stray magnetic fields, a reed switch disposed within the casing, an annular magnet situated within the casing and a movable, rotatable, cylindrical screen of magnetic material which can be positioned between the reed switch and the annular magnet so as to detect the lines of magnetic force and actuate the reed switch—the metal casing, the reed switch, the annular magnet and the screen all being coaxial.

---

This invention relates to detection apparatus.

Such apparatus is more particularly intended for applications such as those of level regulators, fluid circulation indicators which are actuated by liquid circulating in free air, or under pressure, or which are actuated by gas, of end of travel indicators, speed indicators, or excess speed indicators.

According to the present invention there is provided in detection apparatus, a magnetic metal casing acting as a screen against external magnetic fields, a non-magnetic cylinder supported within the casing, a reed switch within the cylinder, electrical connection and terminal means of the reed switch, cover means defining a fluid-tight enclosure within which the electrical connection and terminal means are arranged, and a cylindrical screen of magnetic material interposed between the cylinder and the field-generating means, the position of the screen being related to the phenomenon to be controlled in order to shield the reed switch from the field generated by the field-generating means.

Certain embodiments of detection apparatus in accordance with the invention will now be described, by way of example, with reference to the accompanying diagrammatic drawings, in which FIGURE 1 is a section of one embodiment of a magnetic pick-up with an axial field and cylindrical screens; FIGURE 2 is a similar view of a modification; FIGURES 3, 4, 5 are circuit diagrams of such pick-ups; FIGURE 6 is a perspective view of a rotary cylindrical screen with rectangular openings; FIGURE 7 is a diagram of a level indicator with a float movable along a vertical axis; FIGURE 8 is a modified level indicator with a float movable along a horizontal axis; FIGURE 9 is a section of a fluid circulation indicator for liquid moving in free air; FIGURE 10 is a section of a circulation indicator for liquid flowing in a pressure duct; FIGURES 11 and 12 are cross-sections respectively on the lines XI—XI and XII—XII of FIGURE 10.

FIGURE 13 is likewise an elevation in axial section of a circulation indicator for liquid flowing in a pressure duct, constituting a modification of FIGURE 9.

Figure 7:
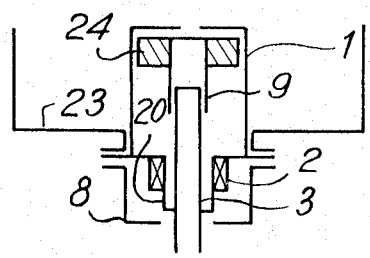

In the embodiment shown in FIGURE 1 the body of the detector is constituted by a casing 1 of magnetic material. In the interior thereof, and rigid with the casing 1, there is secured a permanent magnet 2 of annular form which generates an axial magnetic field along the axis $xy$ coinciding with that of the axis of the casing 1, that is to say with the axis of the detector assembly.

A non-magnetic cylinder 3, taking the form of a tube closed at one of its ends and open at the other end, is placed within the body of the detector in such a manner that the axes of the casing 1 and of the cylinder 3 coincide with $xy$.

The cylinder 3 is mounted in the casing by means of an annular disc 4 of the same metal an the cylinder 3. The assembly of the disc 4 and of the cylinder 3 on the one hand, and of the cylinder 3 and of the casing on the other hand is effected either as desired by welding or by means of screw threads. A reed switch 5 of known type constituted by two reeds of magnetic material is disposed within the cylinder 3. The axis of the reeds of the reed switch also coincide with $xy$, and the point of contact of the reeds is situated in the zone where the field is uniform, that is to say, in the region of the plane of symmetry of the annular magnet. The reed switch is introduced into the cylinder 3 through the open end of the latter, and the electrical connection 6, together with contacts 7, are protected by a cover 8, of which the enclosure defines a space completely separated from the interior of the body of the detector. The medium existing in the body of the detector cannot, therefore, escape.

The movable element of the detector with an axial field is a cylindrical screen 9 of magnetic material, but which cannot be magnetized, such as soft iron. The screen 9 slides freely on the cylinder 3, adjustment being readily effected. This cylinder of several centimetres in height, of a diameter just in excess of that of the cylinder 3, is only several tenths of a millimetre thick. Thus its weight is of the order only of a few grammes. In practical applications the screen 9 has to be made rigid and susceptible to the phenomenon which it must detect or control. When the screen 9 has just been displaced between the magnet and the reed switch, the lines of force of the axial field $xy$ are deflected by the magnetic screen 9 and the internal zone is de-magnetized, as a result of which the switch is actuated. According to the position of the screen 9, the contacts will be open or closed, thus transducing the state of the phenomenon which it is desired to control.

From the electrical point of view, diagrams showing the two embodiments are shown respectively in FIGURES 3, or 4 and 5.

In the case of FIGURE 3, the switch is incorporated in an external circuit of the detector. The apparatus will thus be provided with two terminals 10 and 11 on which there will abut the ends of the contacts and which will receive the two conductors for connection to an external circuit.

In the diagrams of FIGURES 4 and 5, the detector is equipped with a relay 12 intended to increase the electrical possibilities for the contacts of the detector. These contacts therefore act at the command of the relay 12. The detector will thus have two terminals 13 and 14 for connecting the supply voltage of the winding of the relay 12 and also of the terminals 15, 16 and 17, which arrangement is necessary in order to make use of the contacts. The relay 12 is disposed beneath the cover 8 on the side of the terminal mounting.

According to a modification shown in FIGURE 4, the magnetising device of the detector is constituted, instead of the permanent magnet 2, by a winding 18 supplied with a D.C. current and lying on the axis $yx$. The circuit diagram of the detector thus includes the supply for this winding.

Furthermore, if it is necessary, it is possible to include a resistance 19 intended for heating the body of the detector.

For reasons of accessibility or because risk of oxidation, it may be of value to remove the magnet 2 from the atmosphere which exists within the interior of the body of the detector. For this it is sufficient to provide, as illustrated in FIGURE 2, a non-magnetic cylinder 20, having an axis xy, which cylinder supports the magnet. The magnet 2 will thus, for this reason, be in the atmosphere within the cover 8 which constitutes a prolongation of the magnetic casing 1, in order to include the role of a screen in relation to external magnetic influences.

In FIGURES 1 and 2, the magnetic screen 9 is a cylinder sliding on the cylinder 3. In certain applications it may be advantageous to replace it by two cylinders such as 21 coaxial with xy, positioned by their construction in the demagnetisation zone of the contacts. These two cylinders are provided with rectangular openings 22 and may be turned about the axis xy. When the openings of these two cylinders coincide, the contact zone is under the influence of the magnetic field. When the openings are in opposition, the effect of the screen is complete and the switch operates. In the case of two openings for each cylinder, rotation through 90° of one cylinder, the other remaining static, gives rise to two magnetising states in the zone of the switch. In this modification, the phenomenon to be controlled must thus cause a rotational movement of the magnetic screen in place of a translational movement in the case of the sliding screen. In all the embodiments, an opening 1a at the end of the casing 1 allows passage of a slidable and turnable rod, a fluid-type seal being interposed if necessary.

The electrical advantages of the detector shown in FIGURES 1 and 2 are those which result in a general manner from the use of a reed switch:

Rapid interruption whatever the speed of the mechanical movement, large number of operations (at least $10^6$), electrical characteristics independent of the phenomenon which it is required to control.

Moreover, owing to the magnetic casing 1, the apparatus can function secured from external magnetic influences. It should also be noted that the detector is divided into two independent spaces without intercommunication. Finally, the apparatus may be rendered flame-proof, i.e., safe for use in inflammable atmospheres, owing to the fluid-tight enclosure by the cover, or even better by protecting the electrical enclosure in an insulating synthetic-resin.

In the mechanical sphere, all connection between the phenomenon to be controlled and the contacts is eliminated; the weight of the cylindrical screen being low, it has no inertia, the force required is insignificant, and rubbing friction is negligible.

The radial magnetic attraction forces acting in the radial direction to which the movable screen is subjected annul one another because of the axial symmetry. This is an important characteristic of the detector of this embodiment which allows the movable screen to be actuated by a very small force, this being independent of the low weight of this screen.

The length of the translational movement of the cylindrical screen has no influence on the operation of the detector, the essential factor being the position in the region of which the zone of the switch is demagnetized.

The detectors herein described use a reed switch of known type, but is constructed and is conceived in a completely original manner, giving rise particularly to the following advantages:

Low inertia.
Elimination of rubbing.
High precision.
High reliability.
Independence in relation to external magnetic influences.
Fluid-tightness.
Flame-proof capability.
Substantially no wear.
Insensitive to vibrations.
Robustness.
Low manufacturing cost.
Ease of mounting.
Low bulk.
Mechanical and electrical characteristics independent of size.

Because of the absence of force required for actuating the screen 9, the dimensions of the detector are determined in most cases by those of the reed switch. The employment of such a switch of reduced dimensions allows the manufacture of a detector having the form of a cylinder of 35 millimetres diameter and a height of about 40 millimetres mounted as a level detector, without losing any of the mechanical and electrical characteristics, which are wholly independent of the dimensions.

When it is required to use a detector in accordance with the invention, as an indicator of levels with a float, it suffices according to the distance at which it is necessary to place the detector of the level, to move the screen, either by a rod passing through the orifice 1a and connected to the float, or to place the float directly within the mechanical enclosure of the detector and cause it to support itself, the magnetic screen.

The precision resulting from the simplicity of the detector is very high and the range of operation obtained, without difficulty, is 10 millimetres is a reduced rate is required, and 25 centimetres if required.

Also in this embodiment the electrical and mechanical qualities which have been referred to above are also present.

In the embodiment of FIGURE 7, the detector, of which the parts are indicated by the same references as corresponding parts in FIGURES 1 and 2, is disposed at the bottom of a tank 23. It is similar to the detector of FIGURE 2 but is inverted in this embodiment the cylindrical screen 9 is made rigid with a float 24. This application is intended to control the low level of a tank. But the float can also be transferred to the upper part of the tank.

Figure 8:
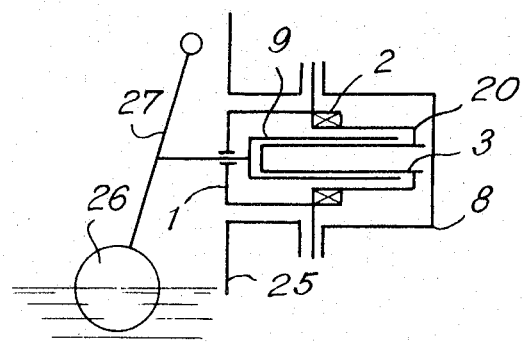

In the embodiment of FIGURE 8, the detector is utilized to control a level along a vertical wall 25 of a reservoir. The axis of the detector could then be disposed horizontally and the float 26 secured to the arm of a lever 27 which is movable in a vertical plane.

In the embodiment shown in FIGURE 9, there is seen at 28 a passage in which a liquid flows vertically, according to the direction of the arrow 29, in contact with a partition 30. An opening 31 in the passage 28 allows communication between the latter with the space 32 of the casing 33.

An orifice 34 in the lower part of the wall 30 allows the discharge of liquid through the exit from the passage 28.

The cylindrical screen 9 is rigid with a float 35 which allows for the interposition of said screen between the magnet 2 and the reed switch disposed within the cylinder 3.

This liquid-circulation indicator allows for the control of the value of the discharge by calibration of the orifice 34. The maintenance of the quantity of liquid in the compartment 32 of the float 35 depends on the discharge rate from this orifice. This device is particularly appreciated, for discharge rates of from 0 to 10 litres, per minute.

This indicator also allows for the removal of an excess flow caused accidentally owing to the overflow passage which is provided. By the same means, fortuitous blockage of the orifice 34 does not give rise to risk of interruption in the circulation of the liquid because the latter makes use of the overflow.

Finally, this indicator does not give rise to any risk of loss of material from the circuit. It possesses all the advantages of the level indicator with a float with a magnetic detector with an axial field and a cylindrical screen, in particular, such construction as to render it flameproof.

In the case of a liquid flowing in a pressure duct, and where the fluid may remain pressurized, the detector is used in the form shown in FIGURES 10, 11 and 12.

The non-magnetic cylinder 36 is made rigid with the duct 37 of which it forms one part. A disc 38 is machined in such a manner that:

On the one hand it allows the passage of liquid (FIGURE 12), on the other hand, it allows the introduction of a reed switch into a cylinder 39 and the passage of electrical connections from the duct through an opening 40 into a casing 41.

Two magnets 42 and 43 are provided, magnet 42 playing the role which has been assigned to it in the detector. Magnet 43 by attraction actuates the magnetic cylinder 44 and causes the return motion of an assembly 45 to the left after the pressure of liquid has ceased.

The assembly 45 is constituted by the non-magnetizable support cylinder 44, slidable on the cylinder 39 and terminated at its end, which faces the flow, by a profiled generally conical member which encounters the dynamic force of the liquid. In the drawing the assembly is shown in its rest configuration. In the absence of flow, the static pressure which exists in the duct, and thus also in the interior of the detector, does not exert any force on the assembly. The latter, derived from the magnet 43, acts to force the conical member against the seating 36 at the inlet to the detector. The section shown in FIGURE 11 shows the grooves formed in the seating and intended to reduce the effects of hammering on the conical member of the assembly. Finally, an enveloping sheath 46 plays the role of the cover 8 of the preceding figures.

The liquid circulation indicator allows: the problem of fluid-tightness to be met which hitherto presented itself in liquid circulation indicators, around the rod transmitting the movement of the vane of the detector which rod passes through the wall of the duct, to have an indication influenced only by the dynamic component of the flow, to control the discharge at a given number of litres per minute under various pressures and inroducing a very low loss of material, whilst the force necessary to actuate the assembly is only a few grams, to replace the return magnet 43 by a direct current winding capable of changing the value of the return force on the assembly 45 whilst causing variation in the magnetic force in this winding, and to give rise to a progressive regulation and be capable of programming the rate of the discharge to be controlled, to be capable of being installed in any position whatsoever and finally to profit from all the advantages of the magnetic detector with an axial field and a cylindrical screen, in particular the built-in capability of being rendered flameproof.

In the embodiment of FIGURE 13 the main duct 47 is divided and the detector in accordance with the invention is mounted in a blind duct 48 serving as the casing 1 defined above.

In contrast to the embodiment of FIGURE 10, the return of the assembly 49, 50, 9 to the rest position is effected by a spring 51. The properties of this detector are the same as those in the embodiment of FIGURE 10, except with regard to the possibility of programming the operation.

Figure 14:
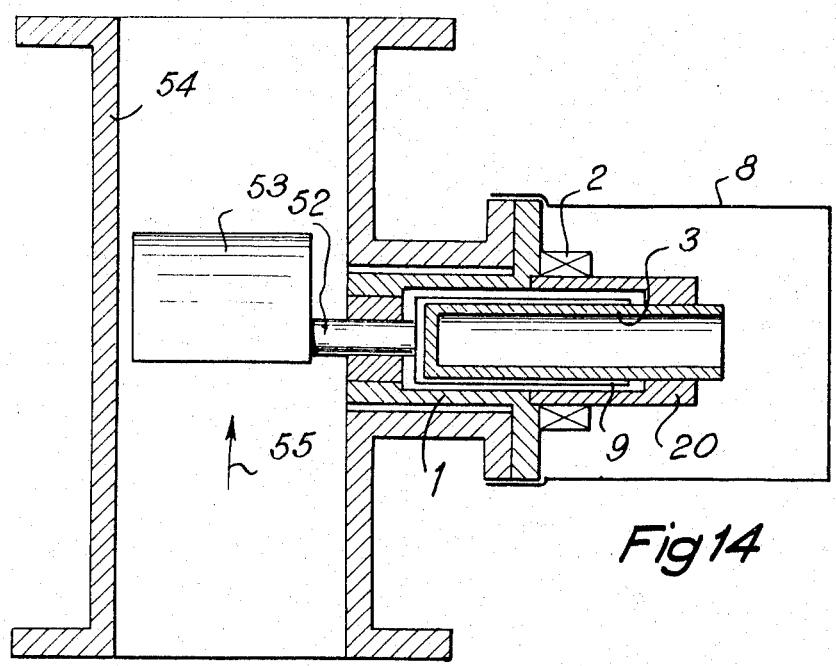
FIGURE 14 is a section of an indicator for the circulation of fluid using a vane for driving the rotary cylindrical screen.

In the embodiment of FIGURE 14 the principle defined above is applied in relation to FIGURE 6 by utilizing as a screen two magnetic aperture cylinders which are mounted coaxially and rotatable with respect to one another. One of these magnetic cylinders is made rigid through the intermediary of a rod 52 with a vane 53 introduced into a duct 54 in which the liquid flows in the direction indicated by an arrow 55. In the absence of flow, the vane falls under the effect of its own weight and is raised again when the flow is re-established. This detector must be mounted about a horizontal axis, but if this disposition is not desired, a return spring may be provided for returning the vane to its rest position, in the absence of fluid flow.

Figure 15:
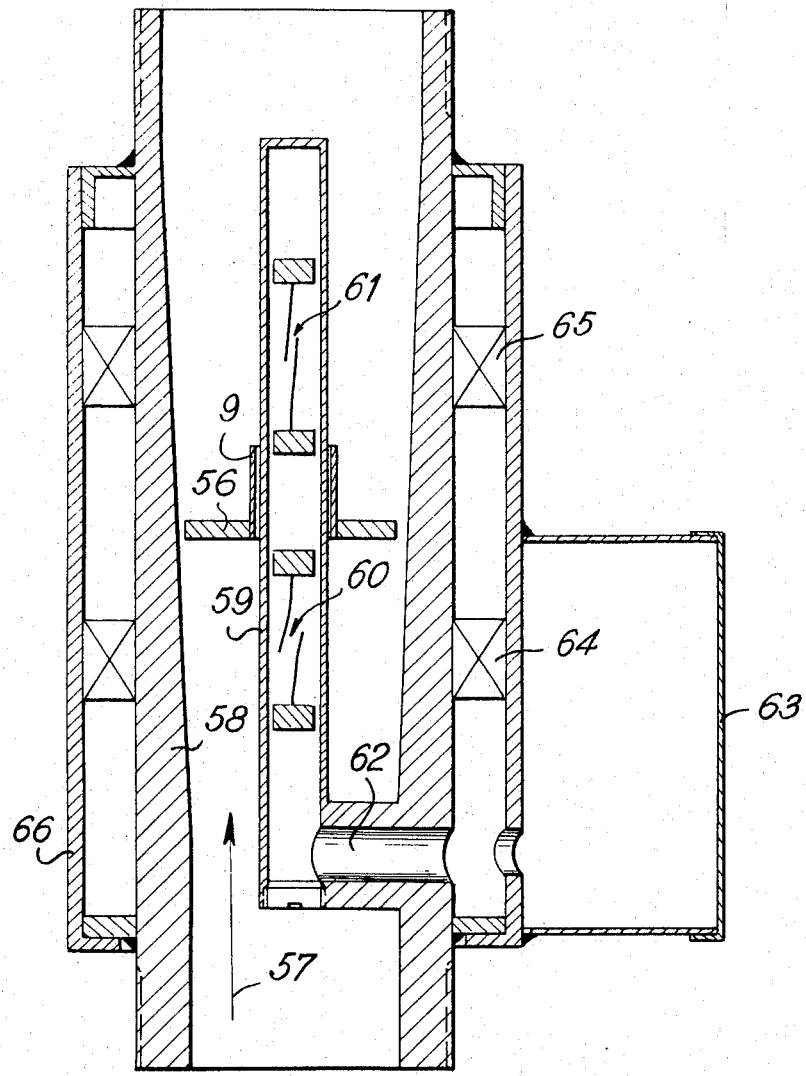
FIGURE 15 is a longitudinal section through an indicator for the circulation of gas enabling control of a minimum and maximum discharge flow.

In the embodiment shown in FIGURE 15, the movable cylindrical screen 9 is mounted on a float 56 dynamically maintained in suspension by the discharge of gas flowing in the direction of an arrow 57 in a duct 58, constituting the body itself of the said detector. The non-magnetic cylinder 59 contains two reed switches 60, 61 superposed on one another of which the connections pass through an opening 62 in order to arrive adjacent the connection or junction box 63. Upstream of the switch 60 a magnet 64 is provided and upstream of the switch 61 there is a magnet 65. A cover 66 similar to the cover 8 described before surrounds part of the duct 58.

The internal shape of the detector is tapered and it serves for the calibration of discharge of gas considered between the body and the float. The float 56 of which the density is higher than that of the fluid to be controlled is in fact a disc. The detector which is to be installed with its axis vertical allows the control of a minimum discharge (assembly 60 to 64) and a maximum discharge (assembly 60 to 65) of gas of which control is possible.

I claim:

1. Detecting apparatus comprising:
    a magnetic metal case constituting a screen against exterior magnetic influences,
    a magnetic field producer coaxial to said case,
    a non-magnetic metal cylinder coaxial with said case and supported by the latter,
    a magnetic interrupter mounted in said cylinder,
    electrical connections and contact limits connected to said interrupter,
    and a movable cylindrical screen of magnetic metal interposed coaxially between the cylinder on the one hand and the producer of magnetic field on the other hand to remove the magnetic interrupter from the field created by the producer of magnetic field.

2. Detecting apparatus according to claim 1 characterized by the fact that said electrical connections and contact limits joined to said circuit breaker are disposed under a casing defining an enclosure separated in an impervious manner from the enclosure defined by said case.

3. Apparatus according to claim 1 wherein the cylindrical screen is comprised of two hollow coaxial cylinders each with window openings so that the rotation of each of said cylinders changes the effective size of said openings extending between the interior of the inner cylinder and the exterior of the outer cylinder.

4. Apparatus according to claim 1 including an assembly to which the cylindrical screen is rigidly attached, said assembly being displaced under the dynamic pressure of the fluid to be controlled so as to move the cylindrical screen to remove the circuit breaker from the field created by the producer of magnetic field, and
    a magnet disposed about said assembly to return the assembly to a rest position when said dynamic pressure falls to a predetermined value.

5. Apparatus according to claim 1 including a pressure-responsive assembly, and
    resilient means disposed about the assembly to restore said assembly to a rest position when said pressure falls to a predetermined value.

6. Apparatus according to claim 1 including a rod rigid with said cylindrical screen,
    said screen being comprised of two hollow coaxial cylinders, each with window openings so that the rotation of either of said cylinders changes the effective size of said openings extending between the interior of the inner cylinder and the exterior of the outer cylinder.

7. Apparatus according to claim 1 including a rod rigid with said cylindrical screen, said screen being comprised of two coaxial cylinders, each with window openings so that the rotation of either of said cylinders changes the effective size of said openings extending between the interior of the inner cylinder and the exterior of the outer cylinder,
   a vane rigid with said rod,
   a duct through which fluid to be detected passes,
   said vane being mounted in said duct, and
   mechanical means for returning the vane to a rest position when said fluid flow falls below a predetermined value.

8. Apparatus according to claim 1 including a rod, and
   a float rigid with the rod,
   said cylindrical screen being comprised of two hollow coaxial cylinders each with window openings so that the rotation of each of said cylinders changes the effective size of said openings extending between the interior of the inner cylinder and the exterior of the outer cylinder.

9. Apparatus according to claim 1, wherein the magnetic-field generating means is a magnet.

10. Apparatus according to claim 1, wherein the cylindrical screen is arranged to make a translational movement.

11. Apparatus according to claim 1, wherein the magnetic-field generating means is disposed within the said casing which acts as a magnetic screen, and is subject to the ambient atmosphere within said casing.

12. Apparatus according to claim 1, wherein the magnetic-field producing means is disposed externally of said casing and is isolated within said cover means, having then to serve as a shield against external magnetic influences.

13. Apparatus according to claim 1, comprising
a gas duct, and
a float within said duct,
the cylindrical screen being rigid with said float and the dynamic pressure of the gas flowing in the duct serving to suspend said float and screen and thereby enable the apparatus to control the flow rate of the gas.

14. Apparatus according to claim 1, comprising
a gas duct,
a float within said duct, said cylindrical screen being rigid with said float,
two said reed switches spaced along the duct, and
two said magnetic-field producing means mounted externally of the duct,
the two reed switches serving to indicate maximum and minimum flows in the duct.

15. Apparatus according to claim 1, comprising
means defining a passage for the flow of fluid to be controlled,
said casing forming an integral part of said passage means.

References Cited
UNITED STATES PATENTS

| | | | |
|---|---|---|---|
| 2,628,297 | 2/1953 | Grauer | 200—81.9 |
| 2,892,051 | 6/1959 | Moore | 200—81.9 |
| 3,155,792 | 11/1964 | Werts | 335—154 |
| 3,164,696 | 1/1965 | Pusch | 335—153 |
| 3,183,487 | 5/1965 | Deeg | 335—153 |

BERNARD A. GILHEANY, *Primary Examiner.*

H. BROOME, *Assistant Examiner.*